UNITED STATES PATENT OFFICE.

JOSEPH G. KNIPPER AND PETER H. KNIPPER, OF ROCHESTER, NEW YORK.

LINIMENT.

SPECIFICATION forming part of Letters Patent No. 417,048, dated December 10, 1889.

Application filed August 31, 1889. Serial No. 322,613. (No specimens.)

*To all whom it may concern:*

Be it known that we, JOSEPH G. KNIPPER and PETER H. KNIPPER, of Rochester, in the county of Monroe and State of New York, have invented a new and useful Composition of Matter to be Used in the Treatment of Sprains, Bruises, Swellings, Backache, and Similar Troubles, of which the following is a specification.

Our composition consists of the following ingredients, combined in the proportions stated, viz: tincture myrrh, two ounces; tincture henbane, one ounce; spirits of turpentine, one-half ounce. These ingredients are mixed together in a bottle or other suitable receptacle.

This composition is used in the treatment of sprains, bruises, swellings, backaches, and similar troubles, and is used by bathing the parts affected, and also, in some cases, by placing cloths wet with the composition over such parts.

Having thus described our invention, what we claim as new is—

The herein-described composition of matter to be used in the treatment of sprains, bruises, swellings, backache, and the like, consisting of tincture of myrrh, tincture of henbane, and spirits of turpentine, in the proportions specified.

JOSEPH G. KNIPPER.
PETER H. KNIPPER.

Witnesses:
CHAS. F. H. YOUNG,
M. M. McNALLY.